US008608293B2

(12) United States Patent
Redding et al.

(10) Patent No.: US 8,608,293 B2
(45) Date of Patent: Dec. 17, 2013

(54) PROCESS FOR ADDING THERMOSET LAYER TO PIEZOELECTRIC PRINTHEAD

(75) Inventors: Gary D Redding, Victor, NY (US); Bryan R Dolan, Rochester, NY (US); Mark A Cellura, Webster, NY (US); Peter J Nystrom, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 42 days.

(21) Appl. No.: 13/279,778

(22) Filed: Oct. 24, 2011

(65) Prior Publication Data

US 2013/0100212 A1 Apr. 25, 2013

(51) Int. Cl.
*B41J 2/045* (2006.01)
*B21D 51/16* (2006.01)
*B23P 17/00* (2006.01)

(52) U.S. Cl.
USPC ........................................... 347/68; 29/890.1

(58) Field of Classification Search
None
See application file for complete search history.

(56) References Cited

U.S. PATENT DOCUMENTS

| | | | | |
|---|---|---|---|---|
| 7,591,535 | B2 | 9/2009 | Nystrom et al. | |
| 7,862,160 | B2 | 1/2011 | Andrews et al. | |
| 7,862,678 | B2 | 1/2011 | Andrews et al. | |
| 7,934,815 | B2 | 5/2011 | Brick et al. | |
| 2010/0294545 | A1 | 11/2010 | Massopust et al. | |
| 2011/0141203 | A1 | 6/2011 | Gerner et al. | |
| 2011/0141204 | A1 * | 6/2011 | Dolan et al. | 347/71 |
| 2011/0141205 | A1 | 6/2011 | Gerner et al. | |
| 2011/0175971 | A1 | 7/2011 | Newton et al. | |

* cited by examiner

*Primary Examiner* — Matthew Luu
*Assistant Examiner* — Erica Lin
(74) *Attorney, Agent, or Firm* — Judith L. Byorick

(57) ABSTRACT

Disclosed is a process for preparing an ink jet printhead which comprises: (a) providing a diaphragm plate having a plurality of piezoelectric transducers bonded thereto; (b) aligning an electrical circuit board having a fill joint with the piezoelectric transducers and temporarily attaching the electrical circuit board to the piezoelectric transducers, thereby creating a layered structure having interstitial spaces between the diaphragm plate, the piezoelectric transducers, and the electrical circuit board; (c) applying a thermoset polymer through the fill joint and allowing it to fill the interstitial spaces via capillary action; and (d) curing the thermoset polymer to form an interstitial polymer layer.

20 Claims, 5 Drawing Sheets

PROCESS FOR ADDING THERMOSET LAYER TO PIEZOELECTRIC PRINTHEAD

BACKGROUND

Disclosed herein are piezoelectric ink jet printheads and methods for making them.

Ink jet systems include one or more printheads having a plurality of jets from which drops of fluid are ejected towards a recording medium. The jets of a printhead receive ink from an ink supply chamber or manifold in the printhead which, in turn, receives ink from a source, such as an ink reservoir or an ink cartridge. Each jet includes a channel having one end in fluid communication with the ink supply manifold. The other end of the ink channel has an orifice or nozzle for ejecting drops of ink. The nozzles of the jets can be formed in an aperture or nozzle plate having openings corresponding to the nozzles of the jets. During operation, drop ejecting signals activate actuators in the jets to expel drops of fluid from the jet nozzles onto the recording medium. By selectively activating the actuators of the jets to eject drops as the recording medium and/or printhead assembly are moved relative to one another, the deposited drops can be precisely patterned to form particular text and graphic images on the recording medium. An example of a full width array printhead is described in U.S. Pat. No. 7,591,535, the disclosure of which is totally incorporated herein by reference. Additional examples of ink jet printheads are disclosed in U.S. Pat. Nos. 7,934,815, 7,862,678, and 7,862,160, and in U.S. Patent Publications 2011/0175971, 2011/0141203, 2011/0141204, 2011/0141205, and 2010/0294545, the disclosures of each of which are totally incorporated herein by reference.

Piezoelectric ink jet printheads typically include a flexible diaphragm and a piezoelectric transducer attached to the diaphragm. When a voltage is applied to the piezoelectric transducer, typically through electrical connection with an electrode electrically coupled to a voltage source, the piezoelectric transducer vibrates, causing the diaphragm to flex which expels a quantity of ink from a chamber through a nozzle. The flexing further draws ink into the chamber from a main ink reservoir through an opening to replace the expelled ink.

One goal of printhead design is to provide increasing numbers of ink jet ejectors in a printhead. The more ink jet ejectors in a printhead, the greater the density of the dot matrix and the higher the perceived quality of the image. One approach to increasing ink jet ejector density in a printhead is to locate the manifold external to the ink jet ejector. One way of implementing this approach includes providing an inlet in the diaphragm layer for each ejector. Coupling the inlet to the manifold to receive ink for ejection from the ejector, however, requires an opening in the piezoelectric transducer layer to enable ink flow from the manifold to the inlet and then into the pressure chamber in the ink jet body plate. Each opening in the piezoelectric transducer layer is located in a polymer portion in the interstices between the piezoelectric transducers.

To facilitate manufacture of an ink jet array printhead, an array of ink jet ejectors can be formed from multiple laminated plates or sheets. These sheets are configured with a plurality of pressure chambers, outlets, and apertures and then stacked in a superimposed relationship. These sheets or plates include a diaphragm plate, an ink jet body plate, an inlet plate, an outlet plate, and an aperture plate. The piezoelectric-transducer is bonded to the diaphragm, which is a region of the diaphragm plate that overlies the ink pressure chamber.

Conventional approaches to assembling a high density ink jet printhead stack array include the use of a thermoset polymer to be used as an interstitial fill between the piezoelectric transducers. The polymer is planarized flat with the piezoelectric transducer array (within 5 microns) and excess polymer on top of the piezoelectric transducer array is etched away to expose clean piezoelectric transducer material for electrical connection. Further, an additional film adhesive layer, the standoff, is used to bond the top electrical connect circuitry to the array. Upon laser drilling, the thermoset polymer becomes a channel for ink flow. Potential quality issues with this method include the possibility of polymer on the top of the piezoelectric transducers, which could cause electrical connectivity issues, and potential bond degradation at the electrical connection from lack of potting material.

Accordingly, a need remains for improved methods for forming high density ink jet printhead stack arrays. In addition, a need remains for methods for making ink jet printheads with fewer layers. Further, a need remains for methods for making ink jet printheads with improved electrical connections. Additionally, a need remains for methods for making ink jet printheads in which there is no need to planarize the polymer with the top of the piezoelectric transducer layer and no need for a post-planarization etching process, thereby eliminating extra processing equipment and steps.

SUMMARY

Disclosed herein is a process for preparing an ink jet printhead which comprises: (a) providing a diaphragm plate having a plurality of piezoelectric transducers bonded thereto; (b) aligning an electrical circuit board having a fill joint with the piezoelectric transducers and temporarily attaching the electrical circuit board to the piezoelectric transducers, thereby creating a layered structure having interstitial spaces between the diaphragm plate, the piezoelectric transducers, and the electrical circuit board; (c) applying a thermoset polymer through the fill joint and allowing it to fill the interstitial spaces via capillary action; and (d) curing the thermoset polymer to form an interstitial polymer layer.

Figure 1:
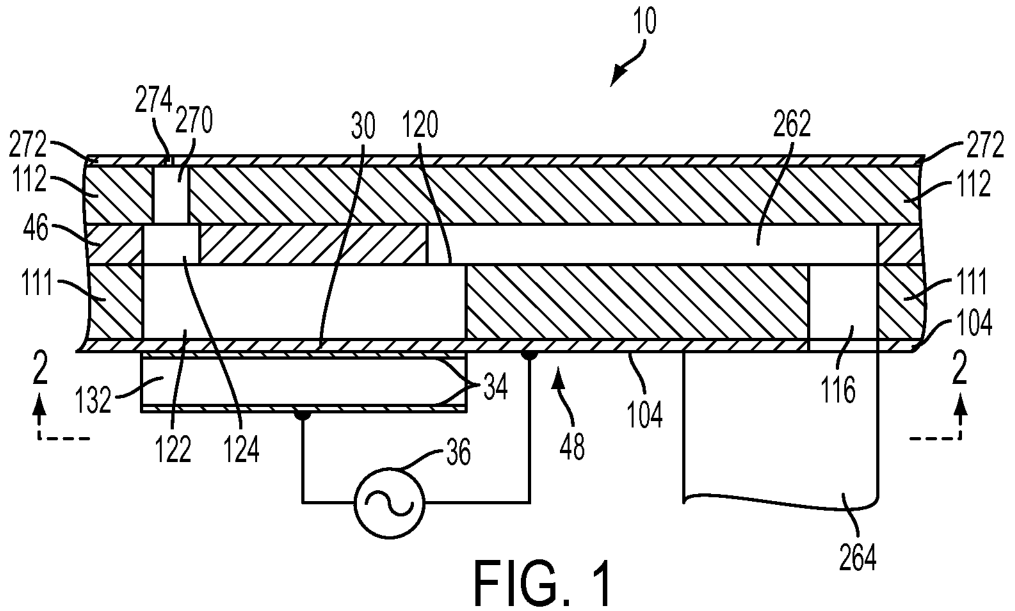
FIG. 1 is a schematic cross sectional side view of an embodiment of an ink jet printer.

Drawings are not to scale.

DETAILED DESCRIPTION

For a general understanding of the environment for the system and method disclosed herein as well as the details for the system and method, reference is made to the drawings. In the drawings, like reference numerals have been used throughout to designate like elements. As used herein, the word "printer" encompasses any apparatus that performs a print outputting function for any purpose, such as a digital copier, bookmaking machine, facsimile machine, multi-function machine, or the like. Devices of this type can also be used in bioassays, masking for lithography, printing electronic components such as printed organic electronics, and making 3D models among other applications. The word "polymer" encompasses any one of a broad range of carbon-based compounds formed from long-chain molecules, including thermoset polyimides, thermoplastics, resins, polycarbonates, epoxies, or related compounds known to the art, as well as mixtures thereof. The word "ink" can refer to wax-based inks or gel-based inks known in the art and can also refer to any fluid that can be driven from the jets, including water-based solutions, solvents and solvent-based solutions, or UV-curable polymers, as well as mixtures thereof. The word "metal" encompasses single metallic elements, including those such as copper, aluminum, titanium, or the like, or metallic alloys, including those such as stainless steel alloys, aluminum-manganese alloys, or the like, as well as mixtures thereof. A "transducer" as used herein is a component that reacts to an electrical signal by generating a moving force that acts on an adjacent surface or substance. The moving force may push against or retract the adjacent surface or substance.

Figure 2:
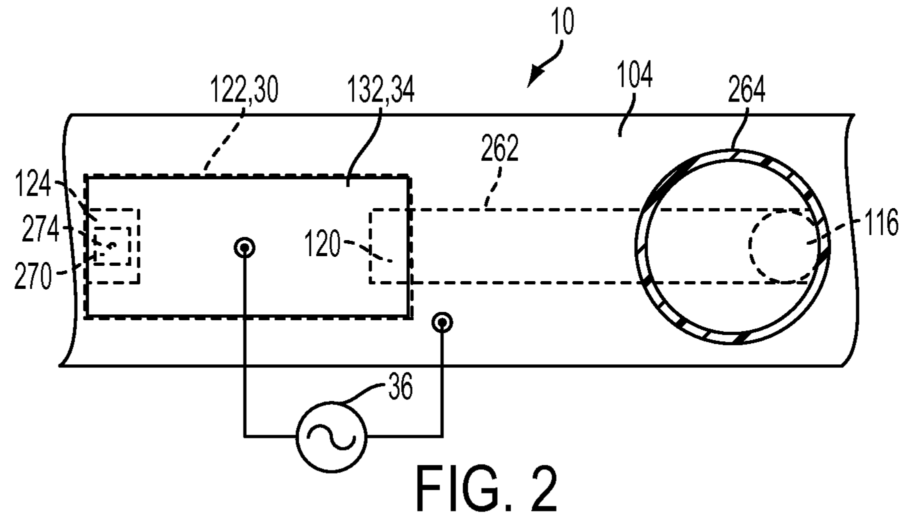
FIG. 2 is a schematic view of the embodiment of the ink jet printer of FIG. 1.

FIGS. 1 and 2 illustrate one example of a single ink jet ejector 10 suitable for use in an ink jet array of a printhead. The ink jet ejector 10 has a body 48 coupled to an ink manifold 264 through which ink is delivered to multiple ink jet bodies. The body also includes an ink drop-forming orifice or nozzle 274 through which ink is ejected. In general, the ink jet printhead includes an array of closely spaced ink jet ejectors 10 that eject drops of ink onto an image receiving member (not shown), such as a sheet of paper or an intermediate imaging member.

Ink flows from the manifold to nozzle in a continuous path. Ink leaves the manifold 264 and travels through a port 116, an inlet 262, and a pressure chamber opening 120 into the ink pressure chamber 122. Ink pressure chamber 122 is bounded on one side by a flexible diaphragm 30. A piezoelectric transducer 132 is rigidly secured to diaphragm 30 by any suitable technique and overlays ink pressure chamber 122. Metal film layers 34 that can be coupled to an electronic transducer driver 36 in an electronic circuit can also be positioned on both sides of the piezoelectric transducer 132.

Ejection of an ink droplet is commenced with a firing signal. The firing signal is applied across metal film layers 34 to excite the piezoelectric transducer 132, which causes the transducer to bend. Upon actuation of the piezoelectric transducer, the diaphragm 30 deforms to force ink from the ink pressure chamber 122 through the outlet port 124, outlet channel 270, and nozzle 274. The expelled ink forms a drop of ink that lands onto an image receiving member. Refill of ink pressure chamber 122 following the ejection of an ink drop is augmented by reverse bending of piezoelectric transducer 132 and the concomitant movement of diaphragm 30 that draws ink from manifold 264 into pressure chamber 122.

To facilitate manufacture of an ink jet array printhead, an array of ink jet ejectors 10 can be formed from multiple laminated plates or sheets. These sheets are configured with a plurality of pressure chambers, outlets, and apertures and then stacked in a superimposed relationship.

Referring once again to FIGS. 1 and 2 for construction of a single ink jet ejector, these sheets or plates include a diaphragm plate or layer 104, an ink jet body plate 111, an inlet plate 46, an outlet plate 112, and an aperture plate 272. The piezoelectric transducer 132 is bonded to diaphragm 30, which is a region of the diaphragm plate 104 that overlies ink pressure chamber 122.

Figure 3:
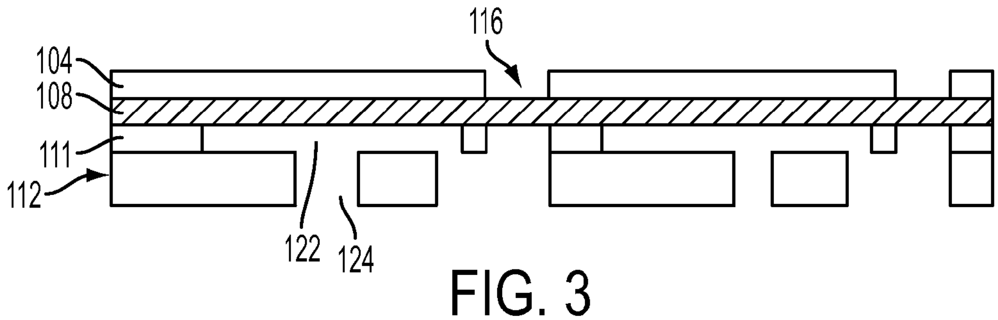
FIG. 3 is a profile view of a partially completed ink jet printhead, including a diaphragm layer, body layer, and a polymer layer.

FIG. 3 is a profile view of a partially completed ink jet printhead including a diaphragm plate or layer 104, body layer 111, and a thermoplastic polymer layer 108. The diaphragm plate 104 may be formed from a metal, ceramic, glass, or plastic sheet that has one or more ink ports 116 that extend through the layer, with one ink port corresponding to each pressure chamber 122 in the body layer 111. The diaphragm plate should be thin enough to be able to flex easily, but also resilient enough to return to its original shape after it has been deformed. The diaphragm layer is bonded to a polymer layer, which is bonded as an unbroken sheet. DuPont ELJ-100® is an example of a material that is suitable to form the polymer layer. The polymer layer may also be formed from a polyimide material or other polymers including polyetherether ketone, polysulfone, polyester, polyethersulfone, polyimideamide, polyamide, polyethylenenaphthalene, etc. The polymer layer can be a self-adhesive thermoplastic or have a thin layer of adhesive deposited on the side of the polymer layer that is placed in contact with the body layer 111. Alternatively, another thermoplastic or thermoset adhesive could be used to bond the polymer layer to the diaphragm. In yet further alternatives the adhesive could be a dispensed or transfer film of liquid adhesive.

The body layer is bonded to the opposite side of the polymer layer. The fluid path layer may be formed from one or multiple metal sheets that are joined via brazing as shown here as the body plate 111 and the outlet plate 112. The fluid path layer can also be made from a single structure molded, etched, or otherwise produced. The fluid path layer contains openings or channels through the various layers that form paths and cavities for the flow of ink through the finished printhead. A pressure chamber is structured with diaphragm layer 104 and polymer layer 108 forming the top portion, the body plate 111 and the outlet plate 112 forming the fluid body layer and providing the lateral walls and base for the pressure chamber. The chamber base has an outlet port 124 that allows ink held in the pressure chamber to exit the body layer when the diaphragm is deformed by a piezoelectric transducer (not shown).

Figure 4:
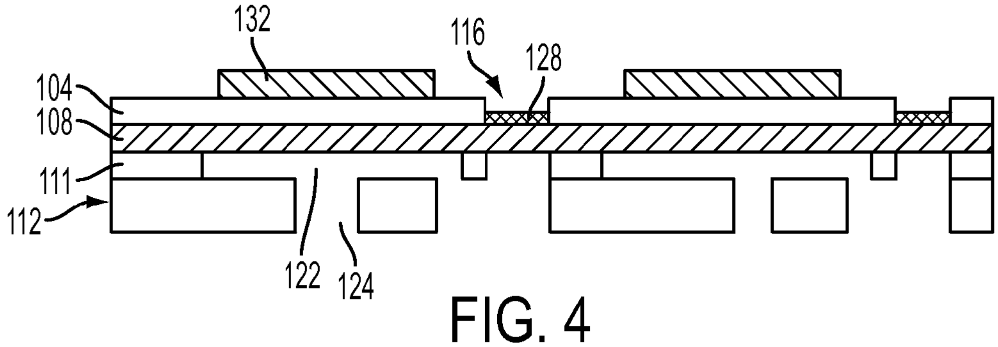
FIG. 4 is a profile view of the same partial ink jet printhead of FIG. 3 additionally including piezoelectric transducers bonded to the diaphragm layer.

FIG. 4 is a profile view of the same partial ink jet printhead of FIG. 3 additionally including bonded piezoelectric transducers. In this view, a piezoelectric transducer 132 has been bonded to the diaphragm plate 104 in alignment with the pressure chamber 122. In order to bond the piezoelectric transducers to the appropriate locations, they are first arranged on a carrier plate (not shown) with the sides opposite the diaphragm plate temporarily affixed to the carrier plate. Then, a thermoset polymer, typically an epoxy, is deposited on the surface of the diaphragm sheet. The carrier plate is aligned with the diaphragm plate, and pressure and heat are applied until the thermoset polymer has bonded the piezoelectric transducers to the diaphragm plate. The carrier plate is then released using known techniques from the piezoelectric transducers. The pressure from the bonding process squeezes excess thermoset polymer 128 from under the piezoelectric elements, leaving residual adhesive on the exposed diaphragm, some of which may flow into the ink ports 116. Flow of the bonding adhesive is stopped at the polymer bonding layer 108. The piezoelectric transducers are now rigidly bonded to the diaphragm plate so that when one of the piezoelectric transducers deforms, the diaphragm plate deforms in the same direction.

Figure 5:
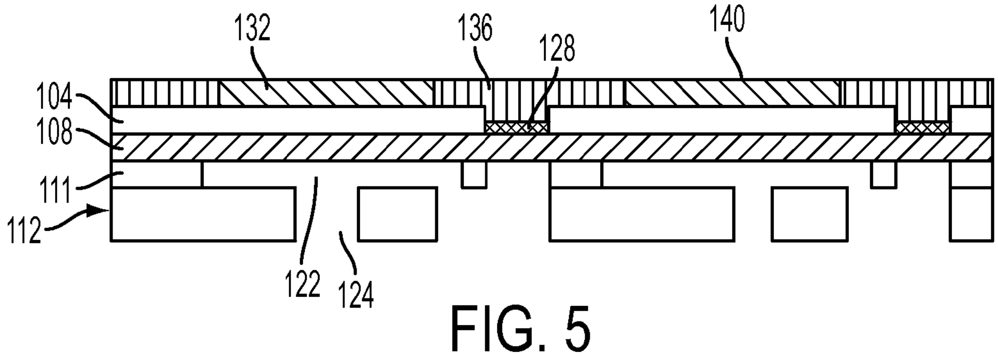
FIG. 5 is a profile view of the same partial ink jet printhead of FIG. 4 further including thermoset polymer filling an interstitial area between the piezoelectric transducers.

FIG. 5 is a profile view of the same partial ink jet printhead of FIG. 4 further including an interstitial polymer layer 136 formed between the piezoelectric transducers. This layer fills in the spaces between piezoelectric transducers including the pre-existing openings in the diaphragm layer.

Interstitial polymer layer 136 is formed from a thermoset polymer. Examples of suitable thermoset polymers include epoxies, acrylics, and the like, as well as mixtures thereof. One example of a suitable thermoset polymer is a combination of EPON™ 828 epoxy resin (100 parts by weight) available from Miller-Stephenson Chemical Co., Danbury, Conn. and EPIKURE™ 3277 curing agent (49 parts by weight) available from Hexion Specialty Chemicals, Columbus, Ohio. The thermoset polymer in one specific embodiment has a modulus of less than one gigaPascal (GPa). The thermoset polymer is dispensed in a quantity sufficient to cover exposed portions of an upper surface of the diaphragm and to encapsulate the piezoelectric transducers subsequent to curing.

In prior known methods of forming piezoelectric printheads, a standoff layer was used to bond the electrical connect circuitry to the array. In contrast, in the embodiments disclosed herein, the interstitial polymer is used to bond the electrical connect circuitry to the array directly, thereby eliminating the need for a standoff layer. The method disclosed herein entails first temporarily securing the electrical connect circuitry to the array, followed by injecting the thermoset polymer (prior to curing) into the spaces formed between the electrical connect circuitry, the diaphragm plate, and the piezoelectric transducers, relying on capillary action of the fluidic thermoset polymer to fill the open cavities of the transducer array.

In one embodiment, an electrical connect circuit, such as a flex circuit, used hereinbelow for illustration purposes, is attached by first stencilling onto the piezoelectric transducers an adhesive, such as an epoxy such as EPO-TEK® E2101, available from Epoxy Technology, Billerica, Mass., or the like, by known methods, such as those described in, for example, U.S. Patent Publication 2010/0294545, the disclosure of which is totally incorporated herein by reference. Formation of depressions or "bumps" in the flex circuit enable alignment of the flex circuit with the piezoelectric transducers. Snap-curing (i.e., curing for periods of about 10 minutes) of the adhesive provides a temporary connection of the flex circuit to the piezoelectric transducers.

Figure 6:
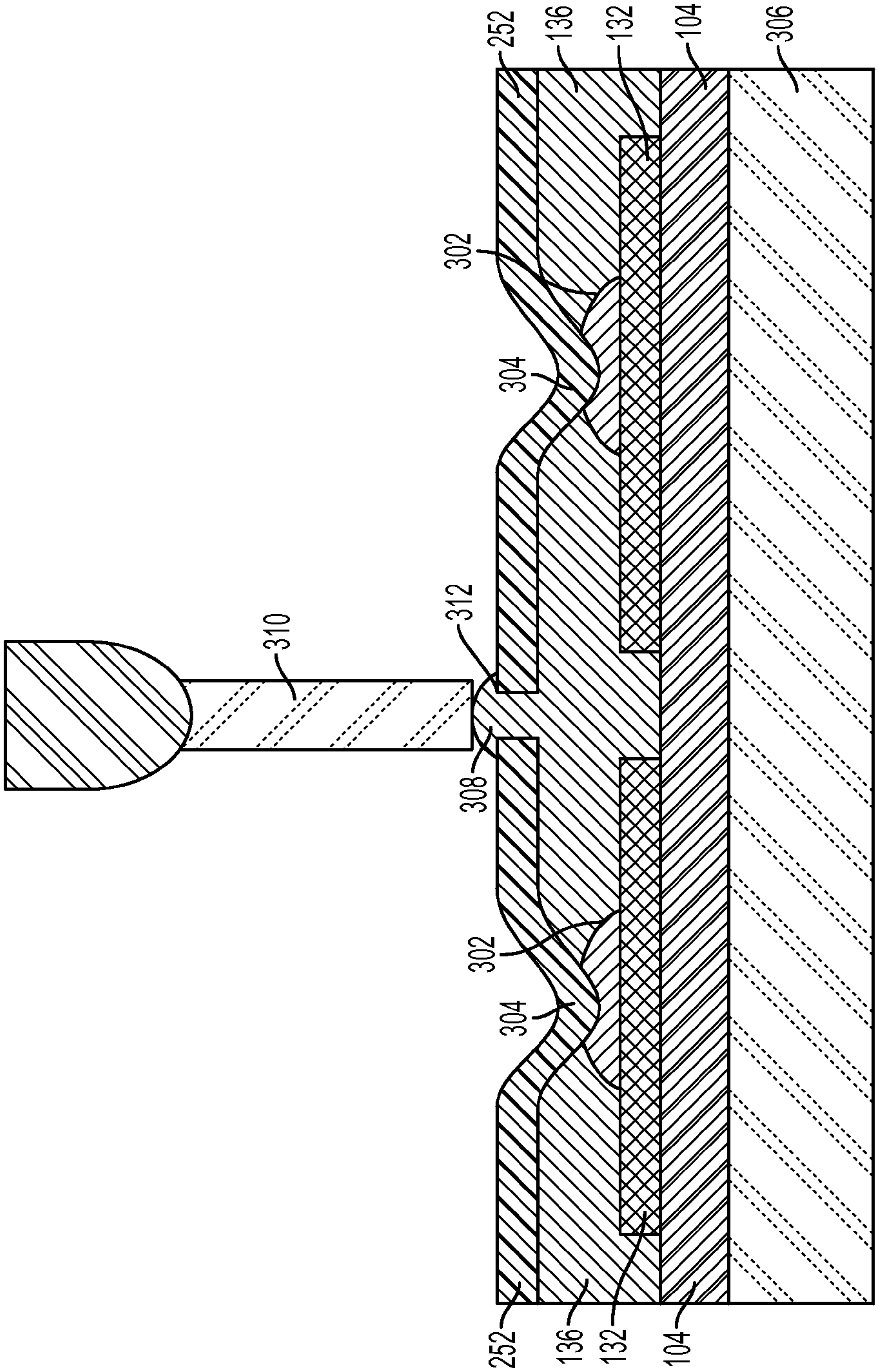
FIG. 6 is a schematic view in profile of an assembly process wherein the underfill layer is applied.

The process of adding interstitial polymer 136 is further illustrated in FIG. 6. As shown in FIG. 6, diaphragm plate 104 having piezoelectric transducers 132 situated thereon is temporarily attached to electrical circuit board (ECB) 252, a flex circuit in this instance, via temporary adhesive 302. Depressions or bumps 304 in flex circuit 252 facilitate alignment of flex circuit 252 with piezoelectric transducers 132. When this assembly has been completed as described in the previous paragraph, the assembly is placed on a heat source 306, such as a hot plate, at a temperature suitable for reducing the viscosity of the thermoset polymer and enhancing the capillary action. In one specific embodiment, this temperature is at least about 25° C., in another embodiment at least about 50° C., and in yet another embodiment at least about 70° C., and in one embodiment no more than about 200° C., in another embodiment no more than about 150° C., and in yet another embodiment no more than about 110° C., although the temperature can be outside of these ranges. Fluid thermoset polymer 308 is then dispensed by any suitable or desired method, such as via a dispense needle 310, through fill hole or joint 312 in flex cable 252. Interstitial spaces between piezoelectric transducers 132, diaphragm plate 104, and flex circuit 252 are filled with interstitial polymer 136 via capillary action.

Figure 7:
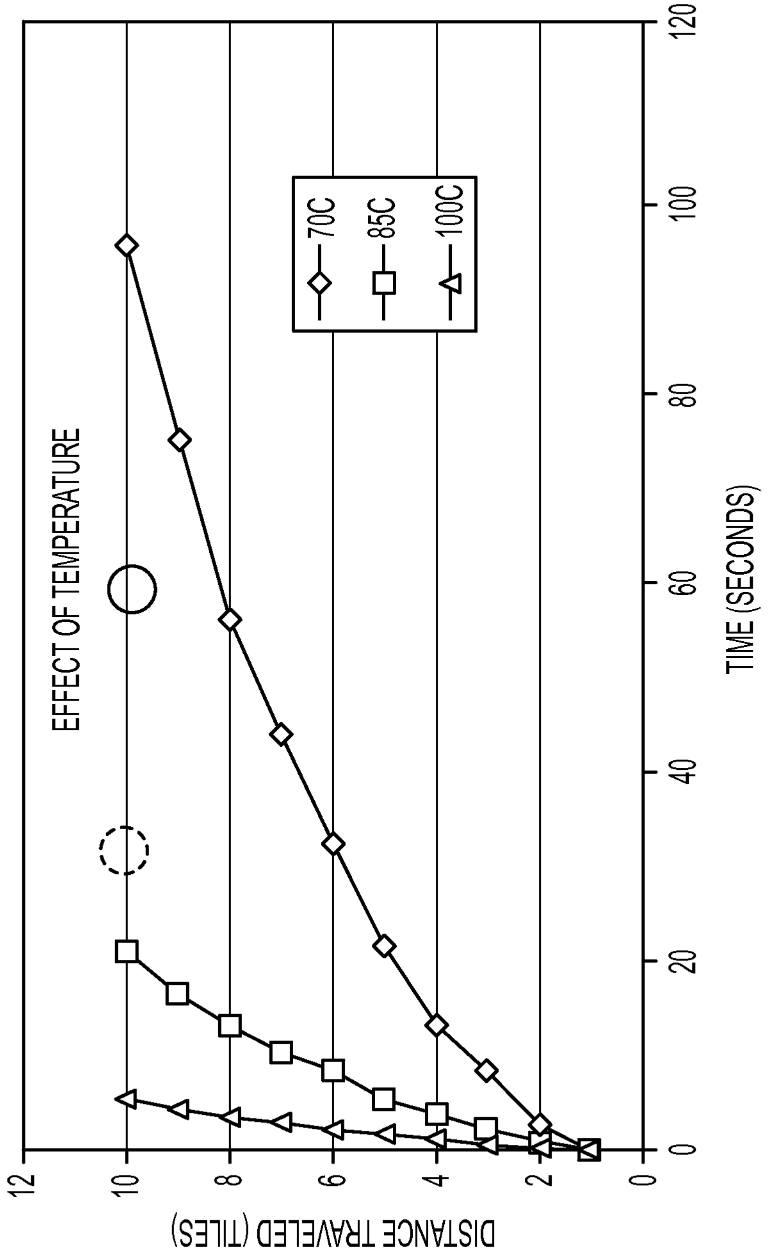
FIG. 7 is a graph depicting the effect of temperature on fill speed for the assembly process of FIG. 6.

Filling can take place from the approximate center of an array, which will halve the number of spaces to be filled per unit of time since the interstitial polymer will be flowing outwards in two directions, or from one end of an array. Other options are also possible, such as filling from two directions at once, filling from an off-center site asymmetrically, or the like. FIG. 7 illustrates the effect of temperature on fill speed when the interstitial polymer is EPON™ 828 epoxy resin (100 parts by weight) and EPIKURE™ 3277 curing agent (49 parts by weight) and the array is 3 inches long and 0.5 inch wide.

The temperature and viscosity of the thermoset polymer affect the speed of flow. If temperature and viscosity are too high, the polymer may cure before it has flowed across the entire array and before all of the interstitial spaces have been filled. If the temperature and viscosity are too low, the polymer will not flow across the entire array. Desirable viscosities depend on the dimensions of the array being filled.

A ridge or bump of excess thermoset polymer 314 will in many instances remain at fill joint 312 subsequent to filling. If desired, this excess can be removed prior to curing by any desired method, such as mechanical wiping. In another embodiment, this excess can be planarized by any desired or suitable method, such as by application of pressure with, for example, a plate or other relatively flat object, in which embodiment the excess remains in place but does not form a ridge or bump.

Final curing can be at any desired or effective temperature, which will, of course, depend on the thermoset polymer selected. Final curing can be by any desired method, such as oven heating or the like. In one specific embodiment, the final curing temperature is at least about 20° C., in another embodiment at least about 50° C., and in yet another embodiment at least about 100° C., and in one embodiment no more than about 300° C., in another embodiment no more than about 250° C., in yet another embodiment no more than about 200° C., and in still another embodiment no more than about 190° C., although the temperature can be outside of these ranges. Final curing can be for any desired or effective amount of time, in one embodiment at least about 2 minutes, in another embodiment at least about 30 minutes, and in yet another embodiment at least about 1 hour, and in one embodiment no more than about 24 hours, in another embodiment no more than about 4 hours, and in yet another embodiment no more than about 2 hours, although the time can be outside of these ranges.

In some embodiments, a thin sheet of non-stick polymer, such as polytetrafluoroethylene (commonly referred to as PTFE and sold commercially as TEFLON®), may be applied to the upper surface of the thermoset polymer before curing to planarize the surface. This PTFE layer is then removed after curing. Alternatively, a UV curable polymer could be used for the interstitial fill and then a UV light used to cure the polymer. The ink inlet holes are then drilled through the multiple polymer layers and through the pre-existing openings in the diaphragm.

Figure 8:
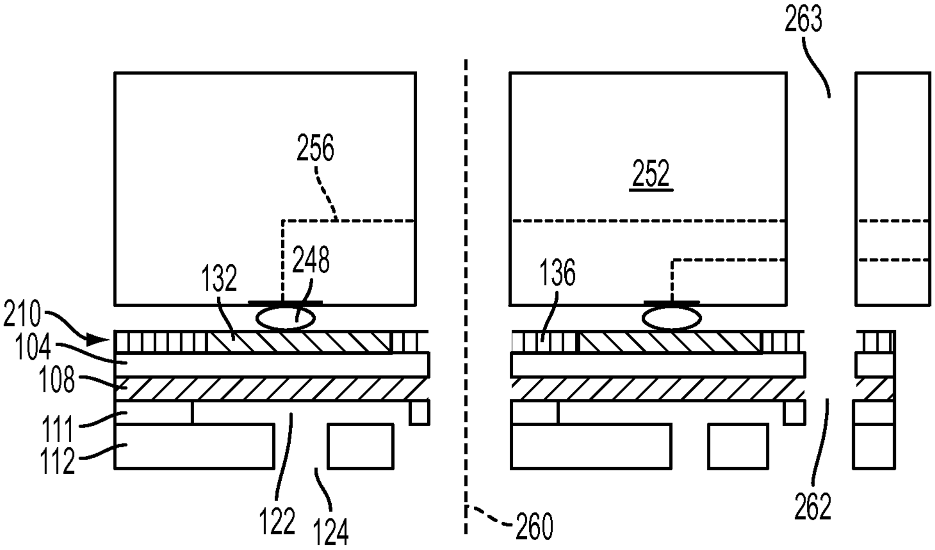
FIG. 8 is a profile view of the completed assembly of FIG. 5 after the assembly is bonded to an electrical circuit board and ink channels have been ablated.

FIG. 8 is a profile view of the completed assembly of FIG. 5 after the ink jet ejector is bonded to an electrical circuit board (ECB) 252 and the ink inlets have been ablated. In one embodiment, a laser is used to drill the ink passages 262 through the polymer layer 108 and the interstitial polymer 136. Many laser drilling processes can be used to form the ink passages through these layers. In one process an excimer laser illuminates a lithography mask with transparent regions corresponding to one or several of the ink passages that are to be drilled through the polymers. The laser illuminated mask openings are positioned on an exposed layer on the printhead in alignment with the locations for the desired openings in the layer. The mask is then imaged onto the exposed surface. The substrate is then moved under a laser imaging system in a step-and-repeat process. Excimer lasers at 248 nm or 308 nm with laser fluence of 250 mJ/cm$^2$ to 800 mJ/cm$^2$ are suitable parameters though other laser wavelengths and fluencies may be used. Alternatively, a scanned laser beam may be used to drill individual ink passages. In this alternative process, the laser can be scanned with galvanometer-driven mirrors and focused onto the substrate with a scan lens. The ink passages can be generated with a beam at a fixed position to produce each hole or it can be scanned in a circle or other shape to form each ink passage through the polymer layers. Suitable lasers for the scanned laser drilling include a solid state laser or a fiber laser at 355 nm or a $CO_2$ laser having a 9.4 to 10.6 μm wavelength.

Pre-existing holes 263 in the ECB 252 are larger than the ink passages 262 and aligned with the ink passages so that the ink path is not interrupted by the circuit board 252. In another embodiment, the circuit board can be replaced by a flexible circuit having electrical pads aligned to the array of piezoelectric elements similar to the ECB. For the flexible circuit pre-existing holes for ink passages can exist, or in one embodiment, the ink passages are formed in the laser drilling process that forms the ink passage 262. As further described below, the full printhead assembly and order of layer processing can happen in many different orders so long as the polymer layer 108 is attached to the diaphragm 104 prior to the piezoelectric elements 132 and interstitial polymer 136 being added to the assembly.

Figure 9:
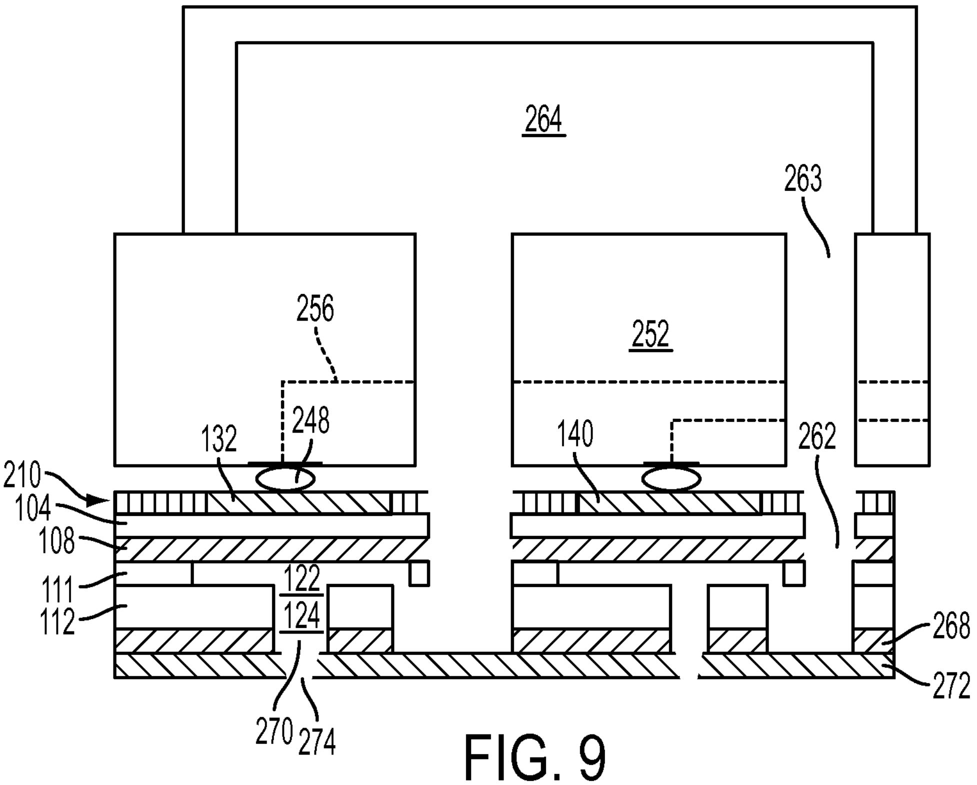
FIG. 9 is a profile view of a complete ink jet head including an outlet plate attached to the body layer and an ink manifold attached to a rigid or flexible electrical circuit layer.

FIG. 9 is a profile view of a complete ink jet head including an aperture plate 272 attached to the outlet plate 112 by aperture plate adhesive 268. The manifold 264 acts as an ink reservoir supplying ink to the inlets of one or more pressure chambers, and each pressure chamber has a dedicated ink inlet connected to the manifold. The body layer 111 is attached to an outlet layer 212 to form a portion of each pressure chamber. The aperture plate adhesive 268 includes an outlet channel 270 corresponding to each pressure chamber. The aperture plate 272 may be formed from metal or a polymer and has apertures or nozzles 274 extending through the plate to allow ink to exit the printhead as droplets.

Other embodiments may have different numbers of layers or combine several functions into a single layer. Other assembly and processing orders are also possible.

In operation, ink flows from the manifold through ECB channel 263 and the inlet port 262 into the pressure chamber 122. An electrical firing signal sent to the piezoelectric transducer 132 in piezoelectric layer 210 via conductive traces 256 and conducting epoxy 248 or other means of producing the electrical connection 248 causes the piezoelectric transducer to bend, deforming the diaphragm 104 and polymer layer 108 into the pressure chamber. This deformation urges ink out the outlet port 124, into the outlet channel 270, and through the nozzle 274 where the ink exits the printhead as a droplet. After the ink droplet is ejected, the chamber is refilled with ink supplied from the manifold with the piezoelectric transducer aiding the process by deforming in the opposite direction to cause the concomitant movement of the diaphragm and polymer layers that draw ink from the manifold into the pressure chamber.

Other embodiments and modifications of the present invention may occur to those of ordinary skill in the art subsequent to a review of the information presented herein; these embodiments and modifications, as well as equivalents thereof, are also included within the scope of this invention.

The recited order of processing elements or sequences, or the use of numbers, letters, or other designations therefor, is not intended to limit a claimed process to any order except as specified in the claim itself.

What is claimed is:

1. A process for preparing an ink jet printhead which comprises:
- (a) providing a diaphragm plate having a plurality of piezoelectric transducers bonded thereto;
- (b) aligning an electrical circuit board having a fill joint with the piezoelectric transducers and temporarily attaching the electrical circuit board to the piezoelectric transducers, thereby creating a layered structure having interstitial spaces between the diaphragm plate, the piezoelectric transducers, and the electrical circuit board;
- (c) applying a thermoset polymer through the fill joint and allowing it to fill the interstitial spaces via capillary action; and
- (d) curing the thermoset polymer to form an interstitial polymer layer.

2. A process according to claim 1 further comprising drilling ink inlet passages through the interstitial polymer layer.

3. A process according to claim 1 wherein the electrical circuit board is a flexible cable.

4. A process according to claim 1 wherein the electrical circuit board is temporarily attached to the piezoelectric transducers by stencilling an adhesive onto the piezoelectric transducers and aligning electrical contacts in the electrical circuit board with the adhesive on the piezoelectric transducers.

5. A process according to claim 1 wherein the interstitial polymer layer permanently bonds the electrical circuit board to the piezoelectric transducers.

6. A process according to claim 1 wherein no standoff layer is situated between the electrical circuit board and the piezoelectric transducers.

7. A process according to claim 1 wherein the thermoset polymer is selected from epoxies, acrylics, or mixtures thereof.

8. A process according to claim 1 wherein the thermoset polymer is an epoxy resin.

9. A process for preparing an ink jet printhead which comprises:
- (a) providing a diaphragm plate having a plurality of piezoelectric transducers bonded thereto;
- (b) aligning an electrical circuit board having a fill joint with the piezoelectric transducers and temporarily attaching the electrical circuit board to the piezoelectric transducers, thereby creating a layered structure having interstitial spaces between the diaphragm plate, the piezoelectric transducers, and the electrical circuit board;
- (c) applying a thermoset polymer through the fill joint and allowing it to fill the interstitial spaces via capillary action; and
- (d) curing the thermoset polymer to form an interstitial polymer layer;

wherein the thermoset polymer is cured at a temperature of at least about 100° C.

10. A process according to claim 1 wherein the thermoset polymer is cured at a temperature of no more than about 190° C.

11. A process for preparing an ink jet printhead which comprises:

(a) providing a diaphragm plate having a plurality of piezoelectric transducers bonded thereto;

(b) aligning an electrical circuit board having a fill joint with the piezoelectric transducers and temporarily attaching the electrical circuit board to the piezoelectric transducers, thereby creating a layered structure having interstitial spaces between the diaphragm plate, the piezoelectric transducers, and the electrical circuit board;

(c) applying a thermoset polymer through the fill joint and allowing it to fill the interstitial spaces via capillary action; and (d) curing the thermoset polymer to form an interstitial polymer layer;

wherein the thermoset polymer is cured for a period of at least about 1 hour.

12. A process according to claim 1 wherein the thermoset polymer is cured for a period of no more than about 2 hours.

13. A process according to claim 1 wherein the fill joint is situated in the approximate center of the array.

14. A process according to claim 1 wherein the fill joint is situated on one end of the array.

15. A process according to claim 1 wherein a plurality of fill joints are present.

16. A process according to claim 9 wherein the thermoset polymer is cured at a temperature of no more than about 190° C.

17. A process according to claim 9 wherein the thermoset polymer is cured for a period of at least about 1 hour and wherein the thermoset polymer is cured for a period of no more than about 2 hours.

18. A process according to claim 9 wherein the interstitial polymer layer permanently bonds the electrical circuit board to the piezoelectric transducers and wherein no standoff layer is situated between the electrical circuit board and the piezoelectric transducers.

19. A process according to claim 11 wherein the thermoset polymer is cured at a temperature of at least about 100° C. and wherein the thermoset polymer is cured at a temperature of no more than about 190° C.

20. A process according to claim 11 wherein the interstitial polymer layer permanently bonds the electrical circuit board to the piezoelectric transducers and wherein no standoff layer is situated between the electrical circuit board and the piezoelectric transducers.

* * * * *